US011084138B2

United States Patent
Chepurny

(10) Patent No.: US 11,084,138 B2
(45) Date of Patent: Aug. 10, 2021

(54) DEBRIS CONTROL APPARATUS FOR CUTTING MACHINES

(71) Applicant: Mark P Chepurny, Bradford (CA)

(72) Inventor: Mark P Chepurny, Bradford (CA)

( * ) Notice: Subject to any disclaimer, the term of this patent is extended or adjusted under 35 U.S.C. 154(b) by 66 days.

(21) Appl. No.: 16/374,708

(22) Filed: Apr. 3, 2019

(65) Prior Publication Data
US 2019/0224798 A1 Jul. 25, 2019

Related U.S. Application Data

(63) Continuation-in-part of application No. 15/438,275, filed on Feb. 21, 2017.
(Continued)

(30) Foreign Application Priority Data

May 11, 2016 (CA) ..................................... 2929584
Feb. 20, 2017 (CA) ..................................... 2958362

(51) Int. Cl.
*B23Q 11/00* (2006.01)
*B23C 1/06* (2006.01)
(Continued)

(52) U.S. Cl.
CPC ............ *B23Q 11/0046* (2013.01); *B23C 1/06* (2013.01); *B23K 26/0853* (2013.01);
(Continued)

(58) Field of Classification Search
CPC ...... A47L 7/0095; A47L 9/02; B23Q 11/0866; B23Q 11/0046; B23Q 11/0042;
(Continued)

(56) References Cited

U.S. PATENT DOCUMENTS 3,837,383 A   9/1974 Ko
3,880,047 A * 4/1975 Dosier ............... B23Q 11/0046
                                                           409/134

(Continued)

FOREIGN PATENT DOCUMENTS

DE     1947664 A    4/1971
DE     3443398 A1   10/2018
(Continued)

OTHER PUBLICATIONS

Machine Translation of JP 2000-272293 A, which JP '293 was published Oct. 3, 2000.*

*Primary Examiner* — Erica E Cadugan
(74) *Attorney, Agent, or Firm* — Christensen, Fonder, Dardi & Herbert PLLC

(57) ABSTRACT

A debris control apparatus is provided for selective assembly and disassembly with a cutting tool. The debris control apparatus includes a debris control enclosure and a mounting assembly for mounting the enclosure to the cutting tool. The enclosure comprises a vacuum opening assembled and in fluid communication with a vacuum conduit, the vacuum conduit connected to a vacuum source, for extracting the debris from the enclosure. The enclosure and vacuum conduit may be sized, shaped, and contoured to reduce recirculation of debris within the enclosure.

7 Claims, 18 Drawing Sheets

Related U.S. Application Data

(60) Provisional application No. 62/316,007, filed on Mar. 31, 2016.

(51) Int. Cl.
  *B23K 26/70* (2014.01)
  *G05B 19/18* (2006.01)
  *B23K 26/38* (2014.01)
  *B23K 37/00* (2006.01)
  *B23K 37/02* (2006.01)
  *B23Q 1/62* (2006.01)
  *B23K 26/08* (2014.01)

(52) U.S. Cl.
  CPC .......... *B23K 26/38* (2013.01); *B23K 26/706* (2015.10); *B23K 37/006* (2013.01); *B23K 37/0235* (2013.01); *B23Q 1/626* (2013.01); *G05B 19/182* (2013.01); *G05B 2219/45145* (2013.01)

(58) Field of Classification Search
  CPC .............. B23Q 11/005; B23Q 11/006; B23Q 11/0071; Y10T 408/50; Y10T 409/304088; Y10T 409/306216–306608; B08B 15/04; B23K 26/142; B27C 5/10
  USPC ........... 408/67; 409/137, 175–182; 451/453, 451/456; 15/415.1; 144/136.95, 154.5
  See application file for complete search history.

(56) References Cited

U.S. PATENT DOCUMENTS

| | | | |
|---|---|---|---|
| 3,942,411 A | 3/1976 | Gerber | |
| 4,037,982 A * | 7/1977 | Clement | B23Q 11/006 408/61 |
| 4,184,226 A * | 1/1980 | Loevenich | B23Q 11/0046 15/339 |
| 4,821,365 A * | 4/1989 | Charters | B23Q 11/0046 144/252.1 |
| 4,909,681 A * | 3/1990 | Drier, Jr. | B23Q 3/002 29/DIG. 82 |
| 5,031,678 A | 7/1991 | Remmele | |
| 5,090,499 A | 2/1992 | Cuneo | |
| 5,340,247 A | 8/1994 | Cuneo | |
| 5,474,116 A * | 12/1995 | Shoda | B23Q 11/0046 144/252.1 |
| 5,632,579 A * | 5/1997 | Susnjara | B23Q 11/0046 408/67 |
| 5,791,842 A | 8/1998 | Sugata | |
| 6,854,937 B1 | 2/2005 | Weiss | |
| 7,160,063 B2 | 1/2007 | Wood | |
| 7,168,894 B2 | 1/2007 | Hansson | |
| 7,465,132 B2 * | 12/2008 | Gipson | A46B 7/04 409/137 |
| 2004/0192184 A1 * | 9/2004 | Staas | B23Q 11/0046 454/49 |
| 2008/0203679 A1 * | 8/2008 | Hermoso | B23Q 11/0046 279/3 |
| 2017/0197286 A1 * | 7/2017 | Sheldon | B23Q 11/0071 |
| 2017/0282318 A1 * | 10/2017 | Chepurny | B08B 15/04 |

FOREIGN PATENT DOCUMENTS

| | | | |
|---|---|---|---|
| JP | 08-071884 A | * | 3/1996 |
| JP | 20000272293 A | | 10/2000 |

* cited by examiner

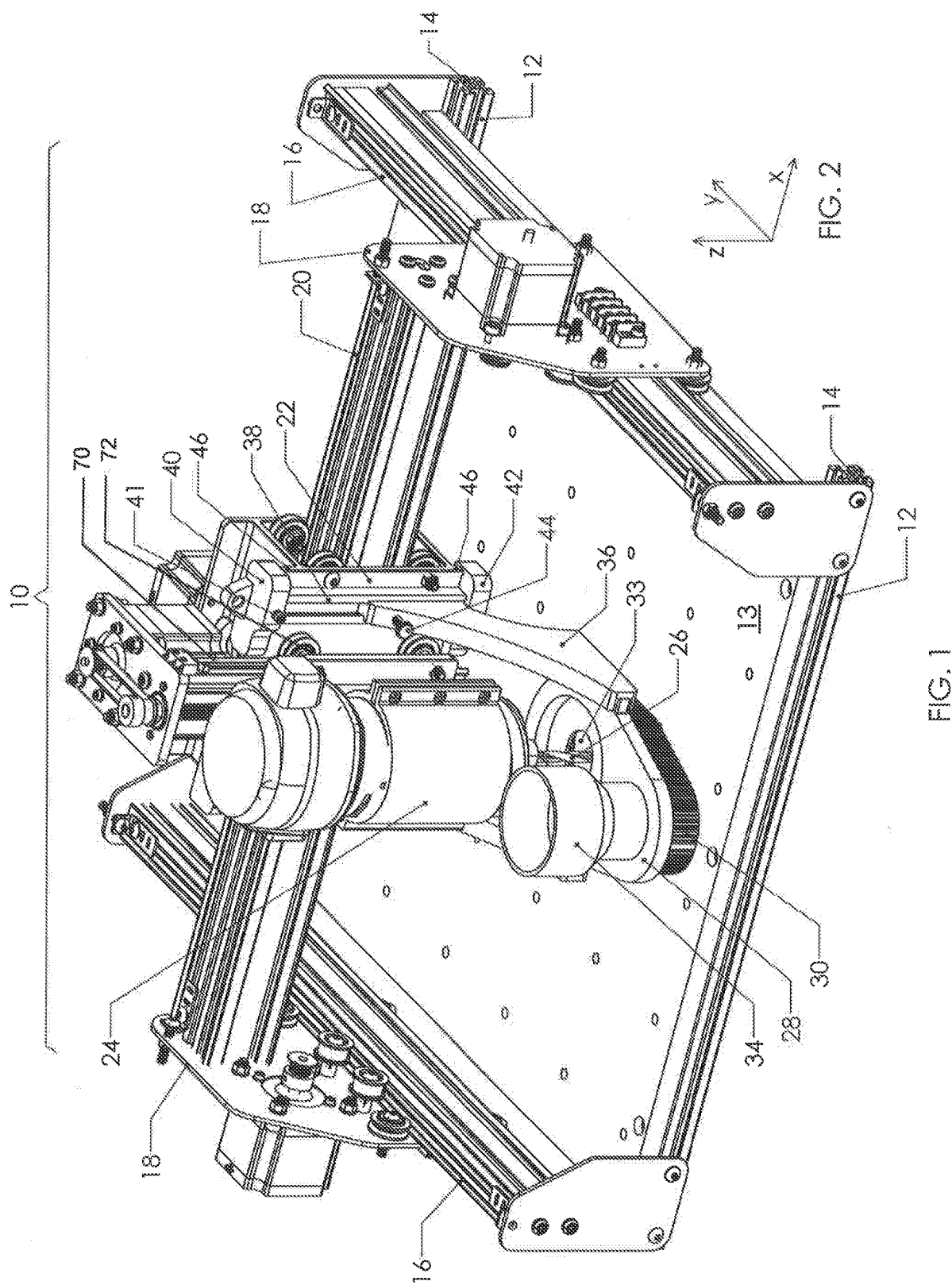

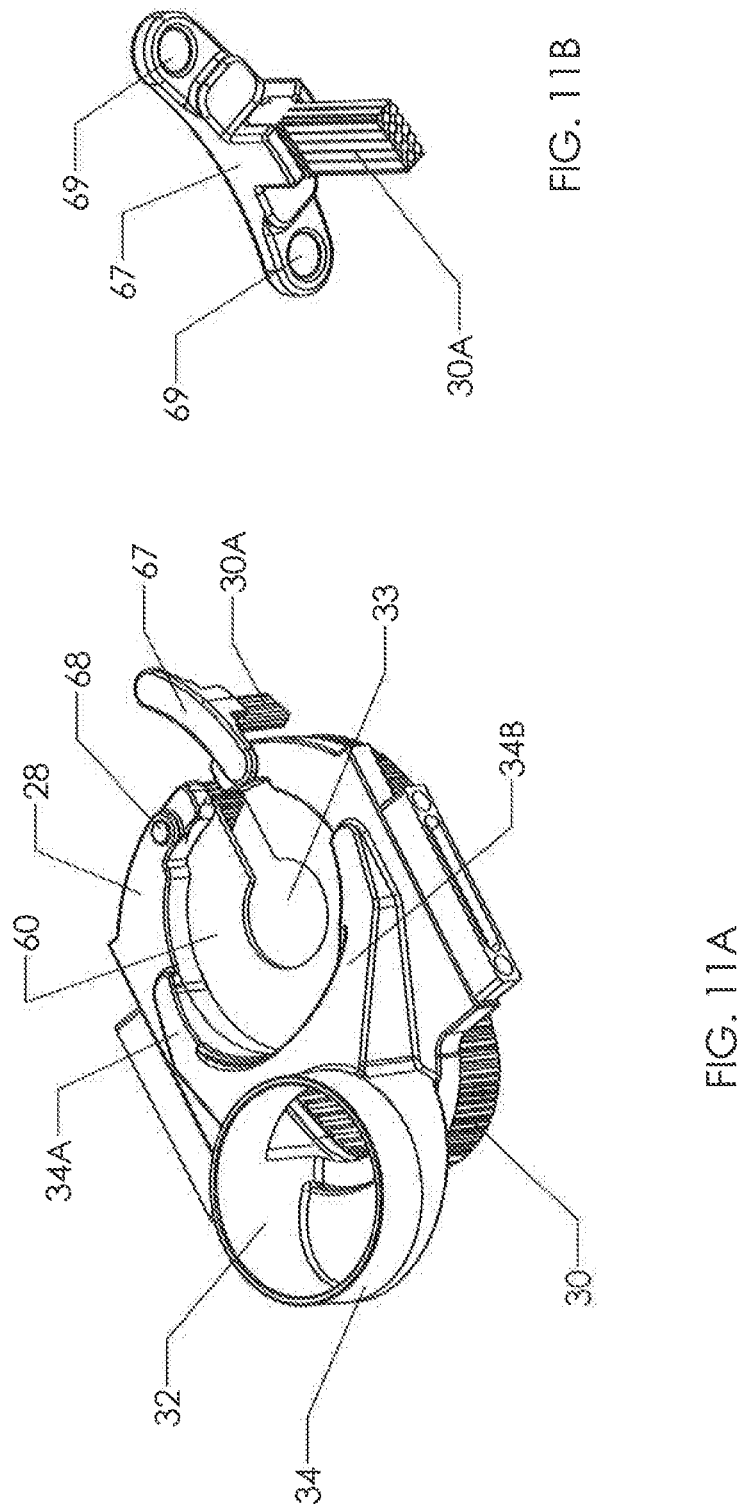

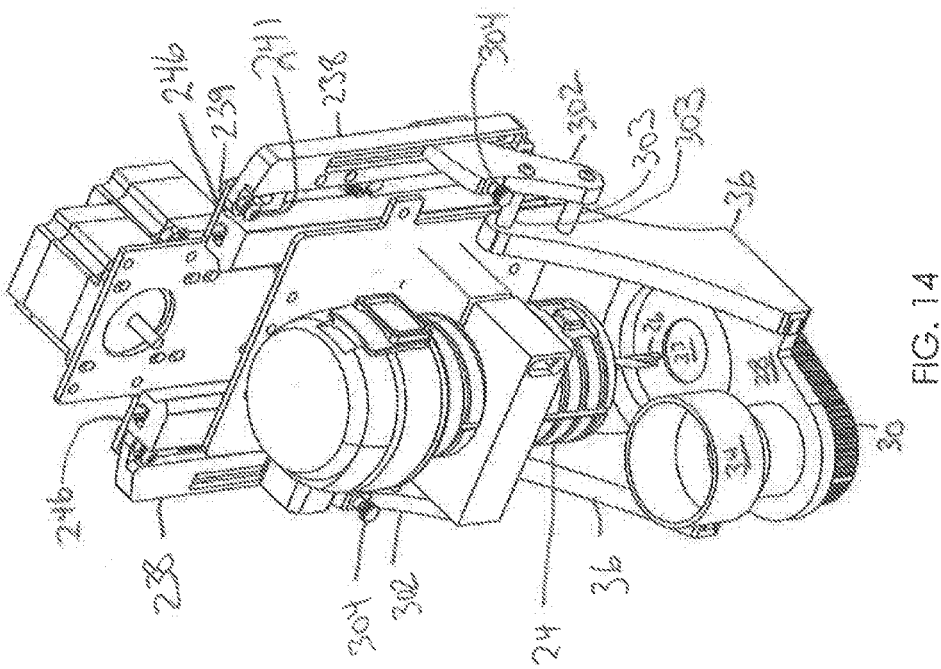
FIG. 14
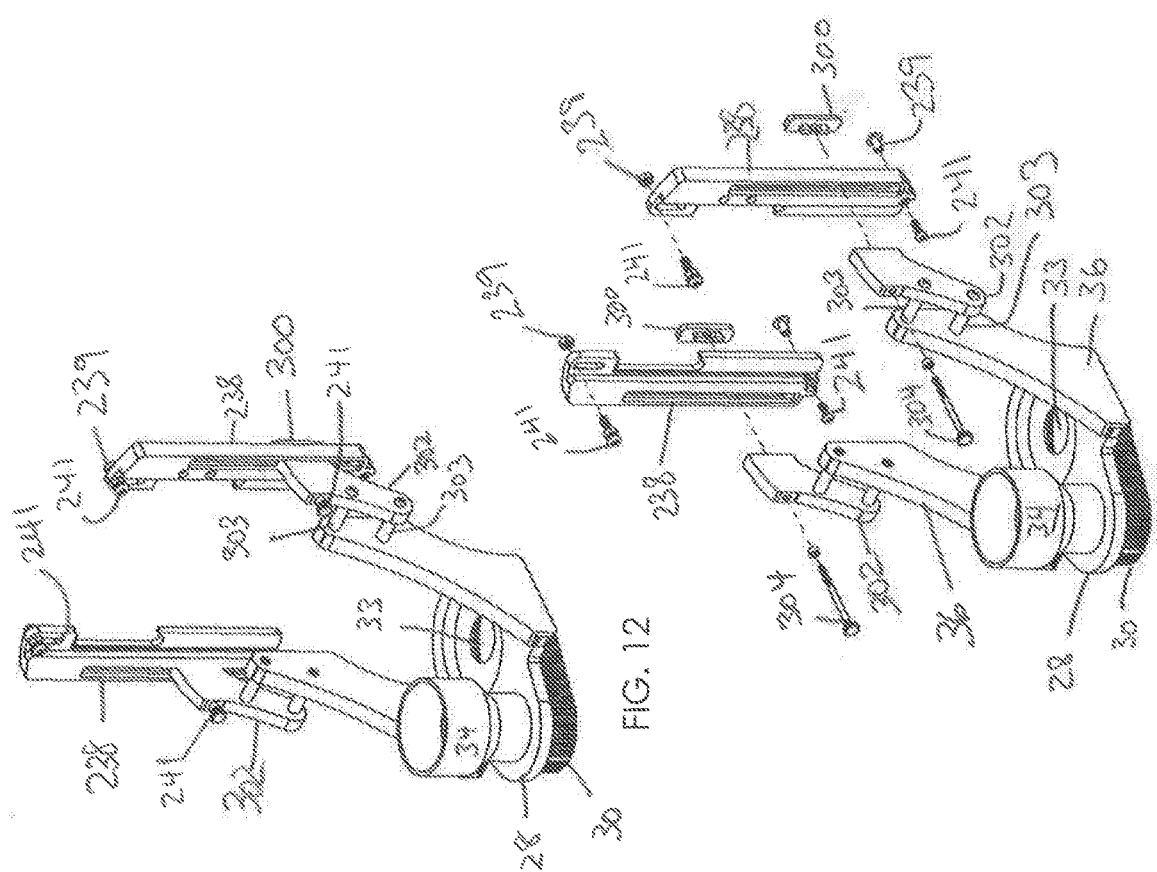
FIG. 12
FIG. 13

DEBRIS CONTROL APPARATUS FOR CUTTING MACHINES

RELATED APPLICATIONS

This application is a continuation-in-part application of U.S. patent application Ser. No. 15/438,275, entitled "Debris Control Apparatus For Cutting Machines", filed Feb. 21, 2017, which claims the benefit of U.S. Provisional Application No. 62/316,007, entitled "Debris Control Apparatus For Cutting Machines", filed Mar. 31, 2016, and claims the benefit of and priority to Canadian Application No. 2929584, entitled "Debris Control Apparatus For Cutting Machines", filed May 11, 2016, and Canadian Application No. 2958362, entitled "Debris Control Apparatus For Cutting Machines", filed Feb. 20, 2017, all of which are hereby incorporated herein by reference in their entireties.

FIELD OF THE INVENTION

This invention relates to the field of cutting machines, and in particular, to the field of debris control for cutting machines.

BACKGROUND

There are a variety of cutting machines commonly in use. Among them are lathes, mills, routers and grinders. More recently, such machines have taken the form of CNC (Computer Numerical Control) machines, which are computer controlled for high precision. Such machines typically operate continuously for a substantial period of time. This is in contrast to a traditional machine being operated by a person, which when actuated by an operator may make one cut, grind, etc., and then be stopped and repositioned by the operator for the next operation.

What such machines have in common is that, when they operate, they cut into the material they operate on, and debris is created in the process. Such debris may include a granular, powdery substance, resulting from the grinding up of the work material into a powder (often called "dust"). The debris may also take other forms, including ribbon-shaped debris, and chunks or lumps of material.

The accumulation of debris in CNC cutting machines is a frequent problem. Because the machines operate continuously for substantial periods of time, debris buildup occurs (unlike machines which are frequently stopped, in which case debris can frequently be swept away). Such debris buildup is detrimental. For example, when such debris builds up at the cutting point, it can increase the rate of wear and tear on the cutting tool (i.e., the blade, bit or other cutting tool actually working on the material). It may even cause the cutting tool to bend or break. As another example, the presence of debris can interfere with the movement of the cutting tool or cause it to deflect undesirably. Particular in high precision applications, debris accumulation can reduce the precision of the cutting below acceptable limits.

There exist in the marketplace dust boots and the like for removing dust and debris from the work surface as the material is being cut. However, these have certain drawbacks. Some are not very effective at removing debris. Some negatively affect the operation of the cutting machine.

SUMMARY

Therefore, what is desired is an apparatus and/or method for debris control that eliminates or improves upon one or more of the negative aspects of the prior art.

Therefore, according to an aspect of the present invention there is provided a debris control apparatus for a cutting machine, wherein the cutting machine includes a cutting tool for cutting a work material, the apparatus comprising:

a debris control enclosure shaped to admit the cutting tool to the work material while containing, within the enclosure and on the work material, debris from the cutting of the work material, as the cutting tool moves along the work material, the enclosure further comprising a debris shield for maintaining the debris at the work material and a vacuum opening in said enclosure, the vacuum opening being sized, shaped and positioned to receiving a vacuum conduit, connected to a vacuum source, for extracting the debris from the enclosure;

a mounting assembly for mounting the enclosure to the machine such that during operation the enclosure moves along the work material as the cutting tool moves along the work material, the enclosure being mounted independent of movement of the cutting tool in and out of the work material;

the mounting assembly comprising a depth adjuster for adjusting the operating depth of the enclosure;

the debris shield comprises a cutting tool access opening through the shield, the cutting tool access opening being contiguous with an edge of the shield, the debris shield further comprising a gate for selectively opening and closing the cutting tool access opening; whereby:

the depth of the enclosure can be adjusted prior to operation such that the debris will be contained in the enclosure during operation;

the shield cannot be separated from the cutting tool while the cutting tool extends through the access opening when the access opening is closed; and the shield can be separated from the cutting tool while the cutting tool extends through the access opening when the access opening is open.

Preferably, the mounting assembly is configured for mounting the enclosure to the machine away from a spindle which carries the cutting tool and moves the cutting tool into and out of the work material.

Preferably, the depth is continuously adjustable within a depth adjustment range.

Preferably, the depth adjuster comprises at least one rail attachable to the machine and having a depth adjustment range, the mounting assembly comprising at least one support arm for supporting the enclosure, the support arm being selectively attachable to the rail at any point within the depth adjustment range.

Preferably, the enclosure comprises a brush, depending from the shield, for controlling the debris as the cutting tool moves along the work material.

Preferably, the shield and brush are sized, shaped and mutually positioned such that the depth of the enclosure can be adjusted to position the brush lightly in contact with the work material such that when the enclosure moves along the work material, the brush maintains the debris under the shield.

Preferably, the mounting assembly and enclosure are configured for selective adjustment in the front-back direction of the operating position of the enclosure.

Preferably, the mounting assembly comprises at least one support arm for supporting the enclosure, and at least one magnetic connector for detachably attaching the enclosure to the support arm.

Preferably, the gate is selectively removable from the debris shield.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Reference will now be made, by way of example only, to the figures which illustrate embodiments of the invention.

FIG. 1 is a perspective view of a cutting machine with an embodiment of the debris control apparatus mounted thereto.

FIG. 2 shows a preferred coordinate system used for positioning of a cutting tool on a cutting machine.

FIG. 11A is a perspective view of a debris shield of a debris control apparatus, in accordance with an alternative embodiment.

FIG. 11B is a perspective view of the gate of the debris shield of FIG. 11A.

FIG. 12 is a perspective view of an alternative embodiment of the debris control apparatus.

FIG. 13 is an exploded view of the alternative embodiment of FIG. 12.

FIG. 14 shows a portion of a cutting machine with the embodiment of FIG. 12 mounted thereto.

Figure 3:
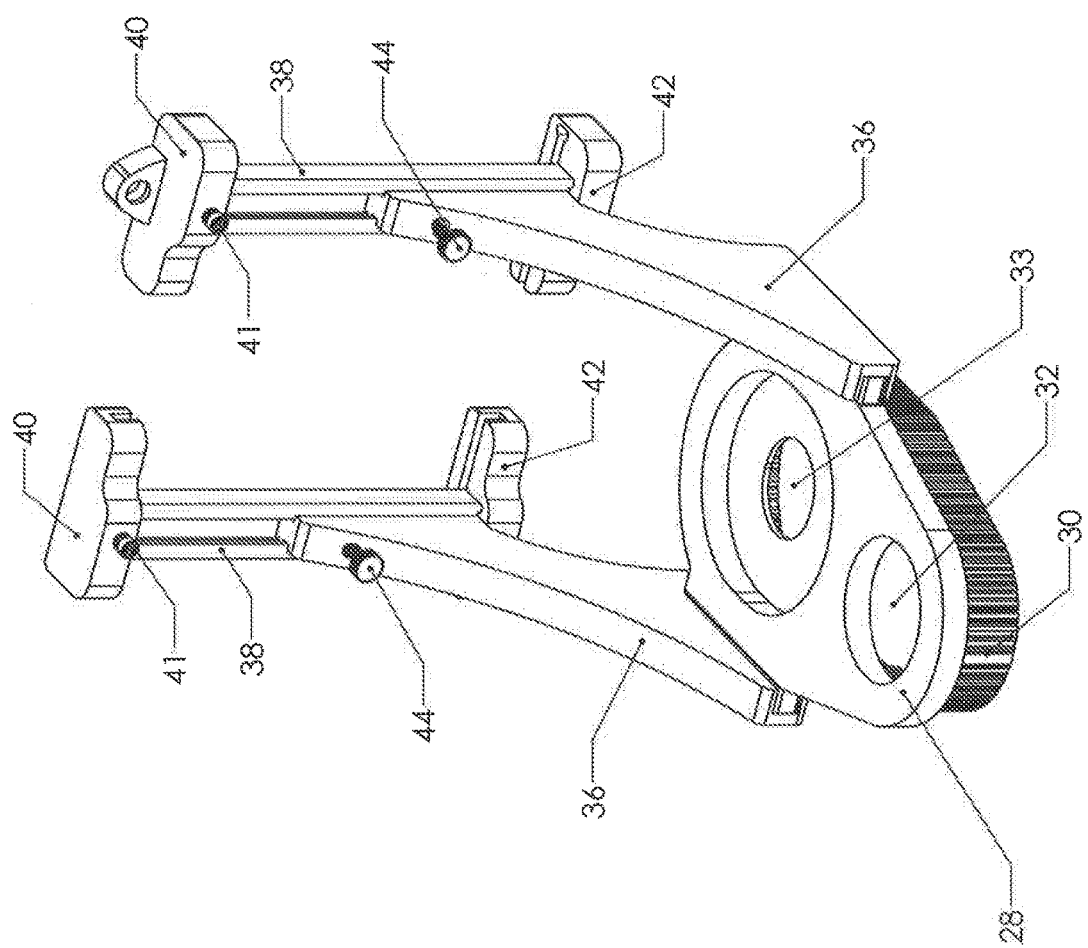
FIG. 3 is a perspective view of an embodiment of the debris control apparatus.

While embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

The invention will be described in detail with reference to the tabletop CNC mill/router shown in the drawings. It will be appreciated that the invention is not limited to such a router. The invention is applicable mutatis mutandis to other cutting machines which produce debris when the machine's cutting tool cuts the work material.

Referring now to FIG. 1, a tabletop CNC router machine 10 is shown. The router 10 is configured to position the routing bit precisely on the work material positioned below the bit. Thus, the router is configured to position the bit at the desired point with reference to the X-axis, Y-axis, and Z-axis (Z-axis refers to moving the bit into or out of the work material). In this specification, the word "depth" refers to the position along the Z-axis, and the term "front-back" refers to the Y-axis. The directions of these axes are shown in FIG. 2.

It will be appreciated that the labels given to the axes are a matter of convention. It will further be appreciated that the axes need not necessarily be the mutually orthogonal axes shown—other coordinate systems could be used to position the cutting tool. What is important in this embodiment of a CNC router is that the bit is positionable in three dimensions for precise locating of the bit.

The machine 10 includes support elements 12 which support the machine 10 on a support surface. In the preferred embodiment, positioned between support elements 12 is work material support surface 14. In a typical use of machine 10, the work material 13 (e.g., acrylic plastic) would be positioned on work material support surface 14 as it is being worked on by the cutting tool.

Positioned on opposite sides of the work material support surface 14, and being supported by support elements 12 are Y-axis support rails 16. The Y-axis support rails 16 each carry a Y-axis carriage 18. By moving along the rails 16, the carriages 18 move the X-axis support rail 20 and X-axis carriage 22, which in turn carry bit 26, to position the cutting tool at the desired position along the Y-axis.

In the preferred embodiment, extending between carriages 18 is X-axis support rail 20. Mounted on X-axis support rail 20 is X-axis carriage 22. X-axis carriage 22 moves along rail 20 to position the cutting tool 26 at the desired position on the X-axis. It will be appreciated that the machine 10 is programmed to move the cutting tool 26 to particular points in the X-Y plane so that the cutting tool can work on the work material 13 positioned on surface 14. The cutting tool 26 is moved to different points on the X-Y plane as the cutting tool 26 works on the work material 13.

It will be appreciated that, in the preferred embodiment, the carriage 22, and at least one of the carriages 18 are motorized so that the computer controller of machine 10 can use the motorized carriages to precisely position the cutting tool.

Mounted to carriage 22 is cutting tool spindle 24. The spindle 24 carries the cutting tool 26, which in the embodiment of FIG. 1 comprises bit 26. For the purposes of CNC machines, the spindle 24 is the element that holds the cutting tool 26 and moves in order to move the cutting tool into and out of the work material 13. Depending on the nature of the cutting tool, the spindle may rotate the cutting tool.

Spindle 24 is movably mounted to carriage 22. Typically, spindle 24 is also motorized, so that the computer controller of machine 10 can move the spindle up and down for precise positioning of bit 26.

A preferred form of the debris control apparatus as shown in FIGS. 1, 3, 4 and 5 will now be described. Debris shield 28 is, in operation, positioned above work material 13. Shield 28 has, extending downward therefrom, brush 30. Preferably, brush 30 is detachably attached to shield 28. Most preferably, brush 30 fits with shield 28 in a friction fit, though other modes of attachment are also comprehended (e.g., magnetic).

Preferably, shield 28 and brush 30 are sized, shaped and mutually positioned so that their depth can be adjusted to position the ends of the bristles of brush 30 to be lightly in contact with work material 13. As will be described in greater detail below, as shield 28 and brush 30 move along the surface of work material 13, brush 30 remains on material 13 (as opposed to moving up off of an then back down to material 13). Thus, shield 28 and brush 30 act as an enclosure for the debris generated, which is thus controlled by brush 30 under shield 28. Brush 30 preferably extends around the entire edge of shield 28 such that, when brush 30 is touching material 13, debris that is under shield 28 is contained thereunder by brush 30 as the enclosure moves along work material 13.

It will be appreciated that brush 30 should preferably be positioned at a depth where it is not pressing hard on material 13, as this would interfere with the movement of the enclosure, and possibly undesirably deform and wear the bristles of brush 30.

In the preferred embodiment, the shield 28 includes vacuum fitting opening 32, sized, shaped and positioned to receive vacuum conduit or fitting 34. A vacuum hose (not shown) can be inserted into fitting 34 so that debris created during operation of machine 10 can be vacuumed out or extracted from under shield 28 as machine 10 is operating. Also, as shown in FIGS. 1 and 2, the shield 28 includes a cutting tool access opening 33 through which the cutting tool extends to reach the work material 13. It will be appreciated that the opening 33 should be big enough to allow the cutting tool to move unimpeded, while being as small as is reasonably possible to keep debris from travelling out from under the shield 28.

In the embodiment of FIG. 1, and as further shown in FIGS. 3, 4 and 5, shield 28 and brush 30 are supported above work material 13 by mounting assembly 37 as follows. Shield 28 is removably mounted to at least one and preferably two support arms 36. Support arms 36 are each mounted to a depth adjusting mounting rail 38. The depth adjusting mounting rails are each mounted to carriage 22 by top and bottom carriage mounts 40, 42, which attach the rail to carriage 22. Carriage mounts 40 are fastened to carriage 22 by the tightening of carriage mount screws 41.

It will be appreciated that it is preferable for shield 28 and brush 30 to be depth adjustable, so that the tips of brush 30 can be positioned at the surface of work material 13 for adequate debris control. In this embodiment, this depth adjustability is achieved by means of the arms 36 being mounted in a depth-adjustable manner to rails 38. As can be seen in FIGS. 1 and 3, arm mounting screws 44 are used to mount arms 36 to rails 38. The depth of arms 36, and thus of shield 28 and brush 30, can be adjusted by loosening screws 44, moving arms 36 up or down within rails 38 as desired, and tightening screws 44 to complete the repositioning of arms 36, shield 28 and brush 30. The rails 38 provide a depth adjustment range, i.e., a range of depths over which arms 36, shield 28 and brush 30 can be positioned. In this embodiment the depth is continuously adjustable within the range.

It will be appreciated that the invention comprehends different depth adjusters besides the combination of arms 36, rails 38 and screws 44 described above. What is preferable is that the depth adjuster provide adequate continuous positioning of these elements to control the debris under shield 28 as shield 28 and brush 30 move along the work material 13.

It will further be appreciated that the precise mode of mounting the shield 28 and brush 30 to the carriage 22 will depend to some extent on the specific shape of carriage 22. In the embodiment of FIG. 1, the carriage 22 includes top and bottom flanges 46. As shown in FIG. 2, carriage mounts 40, 42 include recesses 49 that engage with flanges 46 so that the carriage mounts are attached to the carriage 22. However, the invention comprehends other configurations for mounting the shield 28 and brush 30 to the machine 10, inter alia, in situations where the machine 10 itself has a configuration different from that shown in FIG. 1.

In the embodiment of FIG. 1, the depth adjustability of the mounting is achieved by the arms 36 being mountable at a variety of locations within the depth adjustment range along the rails 38. However, it will be appreciated that a different set of elements can be used to achieve depth adjustable mounting. For example, the support arms could be mounted at a fixed height, while those arms and shield 28 are configured so that the mounting of the shield to the support arms is depth adjustable. Other configurations are also comprehended. What is important is that the shield be depth adjustable so that it can be positioned with brush 30 at work material 13 to control debris under shield 28.

The inventor has discovered that a drawback of some prior art devices is caused by the dust boot being mounted to the spindle. As a result, the dust boot moves up and down as the cutting tool moves up and down. This causes the dust boot to move away from the work material when the spindle moves up, and when the spindle moves laterally while the cutting tool is spaced away from the work material, the debris escapes from under the shield. In the preferred embodiment of the present invention, this problem is ameliorated, because when the machine 10 operates the shield 28 and brush 30 function as an enclosure that is in contact with the work material, thus maintaining the debris under shield 28.

Furthermore, it has been found that mounting a dust boot to the spindle has a negative effect on the precision of the machine 10, particular in relation to Z-axis (depth) positioning of the cutting tool. Specifically, the weight of the dust boot affects the ability of the motorized spindle to precisely position the cutting tool, most commonly (but not solely) in cases where the dust boot is retrofitted to the machine 10. However, in the preferred embodiment of the present invention, the shield 28, brush 30 and mounting assembly do not depend from the spindle 24. The spindle 24 moves the cutting tool 26 up and down without the shield 28 moving, because the shield is mounted to machine 10 independent of the spindle 24, and independent of the movement of the cutting tool in and out of the work material; thus the spindle 24 moves up and down independent of the shield 28 (i.e., without moving shield 28) and its various mounting elements.

Figure 4:
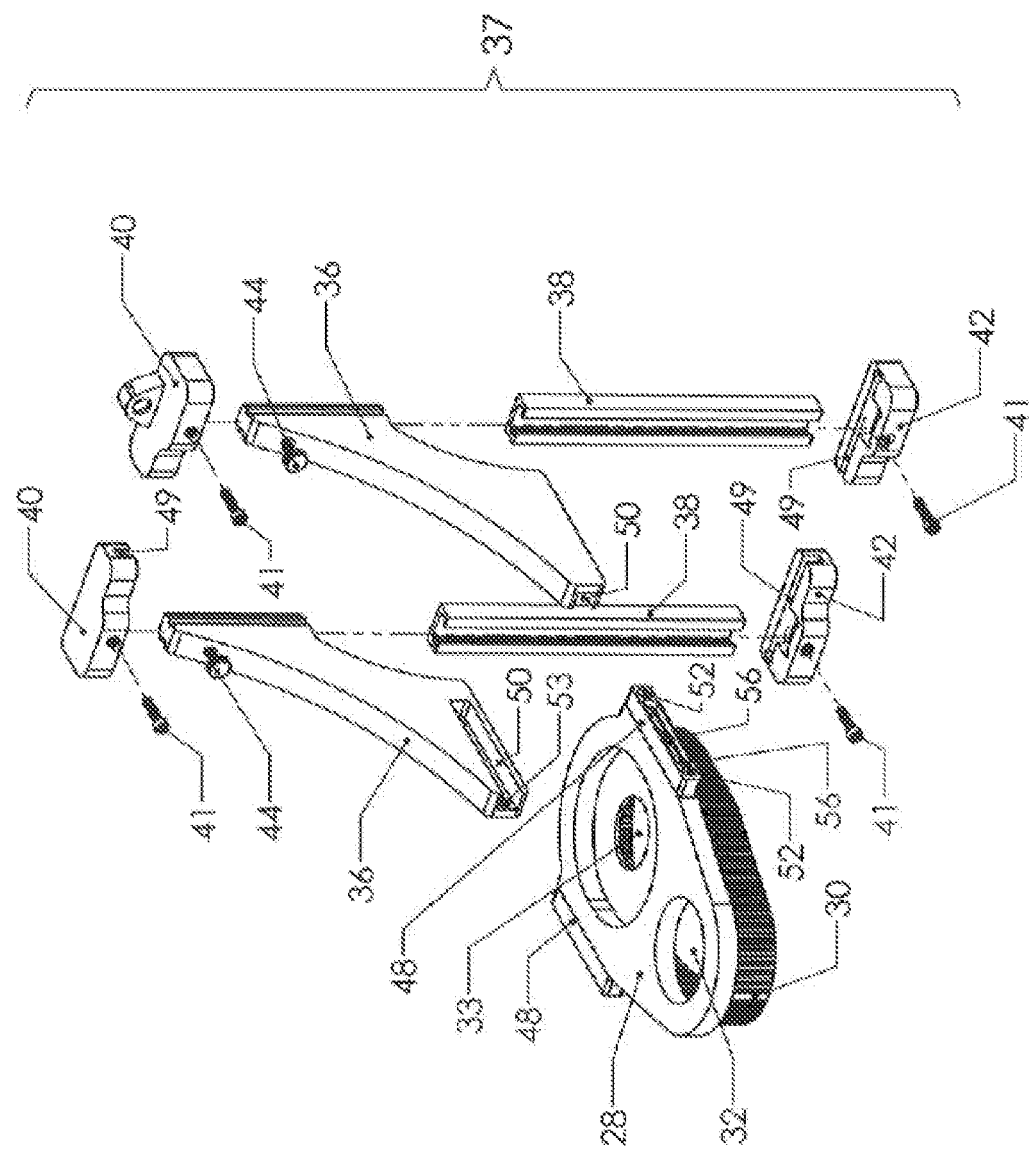
FIG. 4 is an exploded perspective view of an embodiment of the debris control apparatus.

As shown in FIGS. 3 and 4, the shield 28 is preferably removably mounted to support arms 36, and preferably configured for attachment to and removal from the mounting assembly in a front-back direction (though attachment and detachment in a sideways direction may also be adequate). Shield 28 includes a flange 48 corresponding to each arm 36, which flanges are sized, shaped and positioned to fit into recesses 50 of arms 36. Thus, when the debris control apparatus is being assembled or disassembled, the shield 28 can be fitted into arms 36 by inserting flanges 48 into recesses 50, or removing flanges 48 from recesses 50. It will be appreciated that this feature can be helpful when the cutting tool or work material are being changed. Specifically, because shield 28 can be easily removed from arms 36, it is not necessary to take apart the mounting assembly, or even change the depth of the mounting assembly, to change the bit or the work material. Rather, in this embodiment, the shield 28 is detached, the bit or work material is changed, and the shield is reattached, without any other action taken on the mounting assembly.

In the preferred embodiment, the each flange 48 includes at least one and preferably two flange magnets 52, and the recesses 50 each include corresponding recess magnets 53. Magnets 52 and magnets 53 are mutually attracting, and they are sized, shaped and positioned to hold shield 28 to arms 36 by holding flanges 48 within recesses 50. When it is desired to remove shield 28 from recesses 50, a user pulling on shield 28 can pull to overcome the force of the magnets, and remove the shield 28. The shield 28 is thus detachably attachable to arms 36. It will be appreciated that the embodiment of the invention comprehends other forms of attaching the shield 28 arms 36. For example, locking pins or the like could be used, as could a friction fit.

Figure 5:
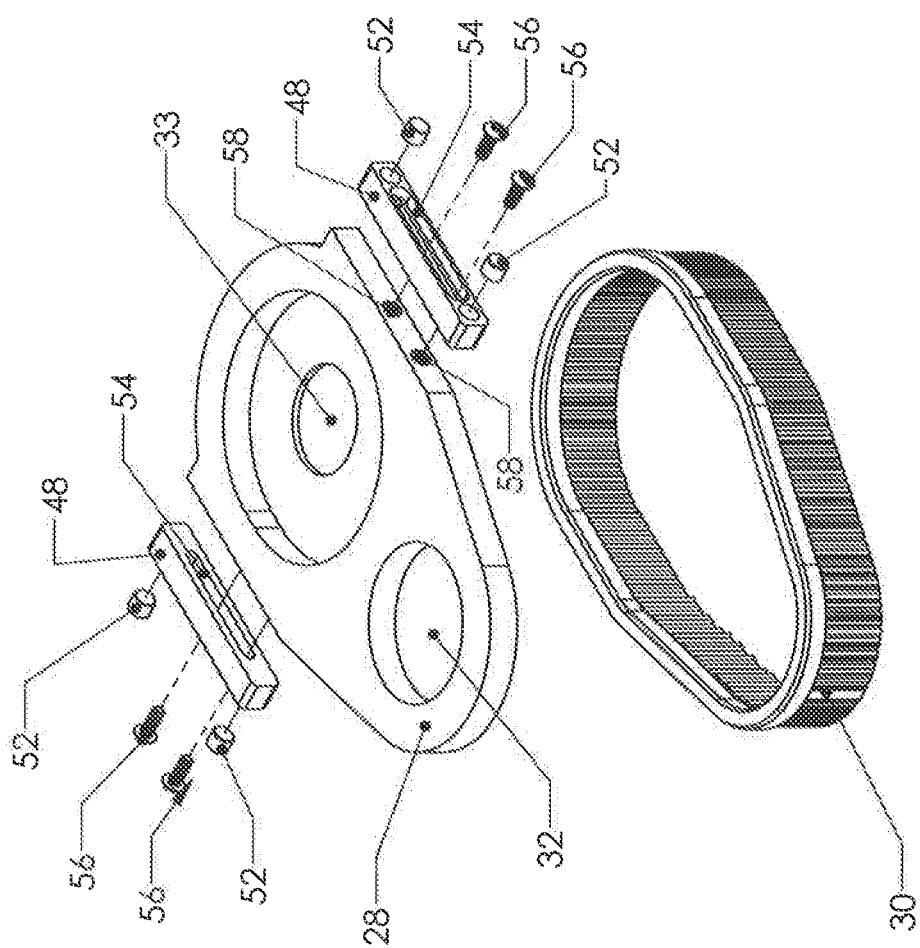
FIG. 5 is an exploded perspective view of a portion of an embodiment of the debris control apparatus.
Figure 7:
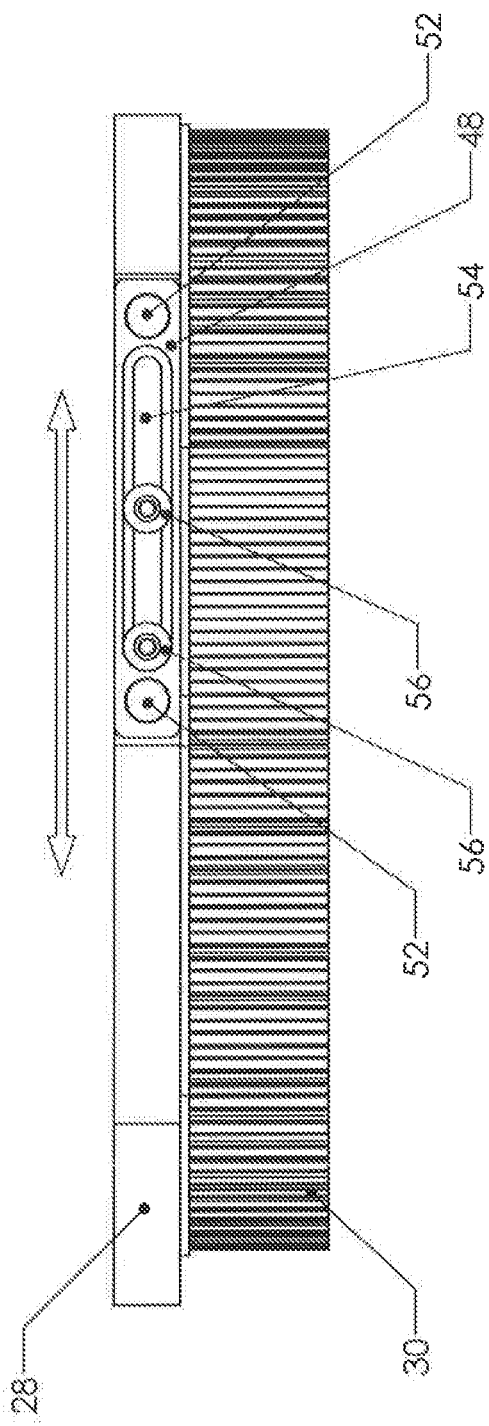
FIG. 7 is an elevation view of the shield and brush that form part of some embodiments of the debris control apparatus.
Figure 8:
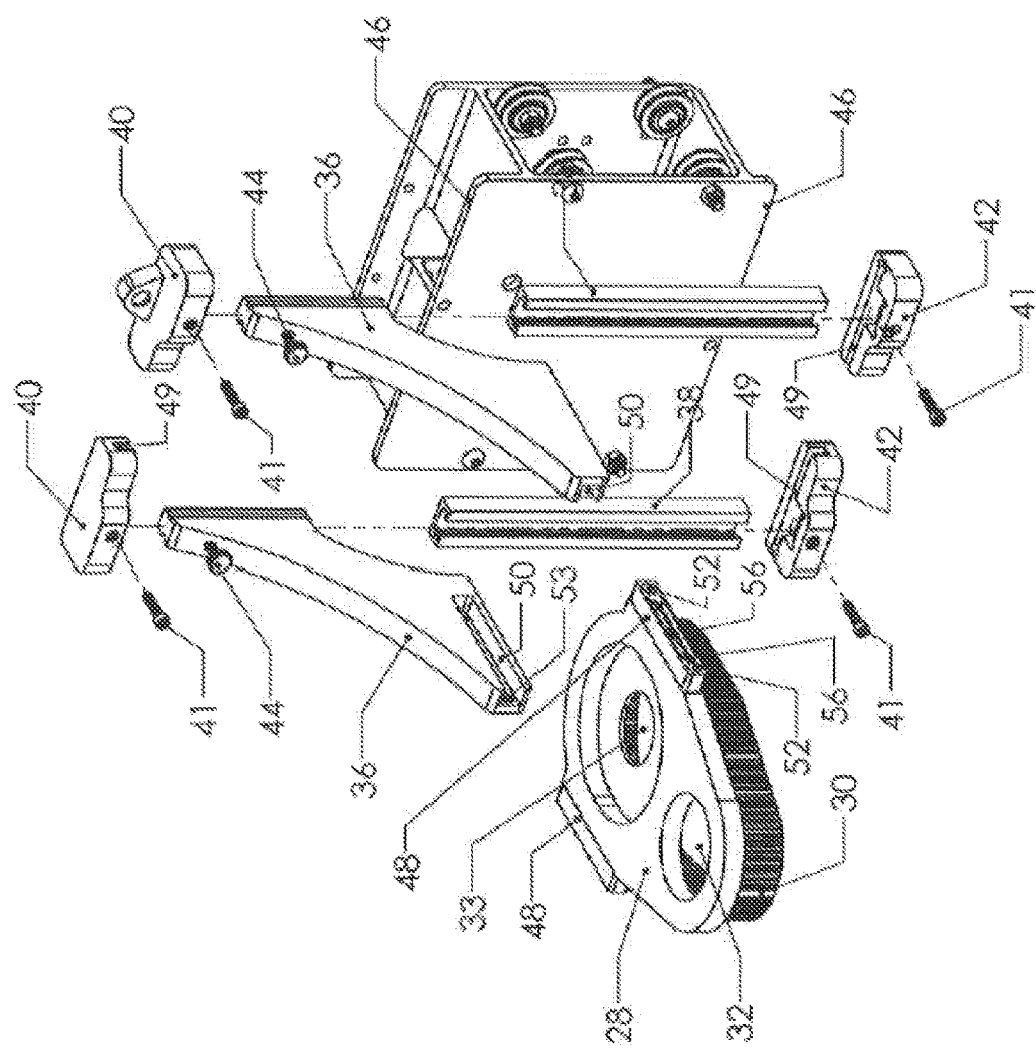
FIG. 8 is an exploded perspective view of an embodiment of the debris control apparatus.

In the preferred embodiment, as shown in FIGS. 5 and 7, flanges 48 are selectively positionable on shield 28. Flanges 48, which are detachably attachable to shield 28, each preferably includes flange openings 54. Flange screws 56 and flange openings 54 are sized and shaped for the attachment of flanges 48 to shield 28. In this embodiment, screws 56 are inserted through opening 54 and screwed into flange attachment holes 58 in shield 28. Because holes 58 (a pair for each flange) are closer together than the width of the opening 54—that is, opening 54 is wider than the distance between holes 58—there is a range of possible attachment positions for flanges 48.

The attachment position of flanges 48 to shield 28 in turn dictates the position of shield 28 relative to arms 36, carriage 22, spindle 24 and bit 26. The further back (i.e., toward the top of FIG. 1) the flanges are positioned, the further forward the shield 28 will be positioned when mounted, and vice versa. Thus, this configuration allows the operating position of shield 28 to be selectively adjusted in the front-back direction (i.e., along the Y axis) according to the specific configuration of machine 10, to allow, inter alia, the opening 33 to line up with bit 26, so that machine 10 can operate with the debris control apparatus mounted to it. It will be appreciated that other configurations that permit selective positioning of shield 28 relative to bit 26 are comprehended. What is important in the preferred embodiment is that the shield 28 be mounted so as to be selectively positionable in the front-back direction relative to the bit 26 so that the bit 26 will line up with opening 33.

Figure 6:
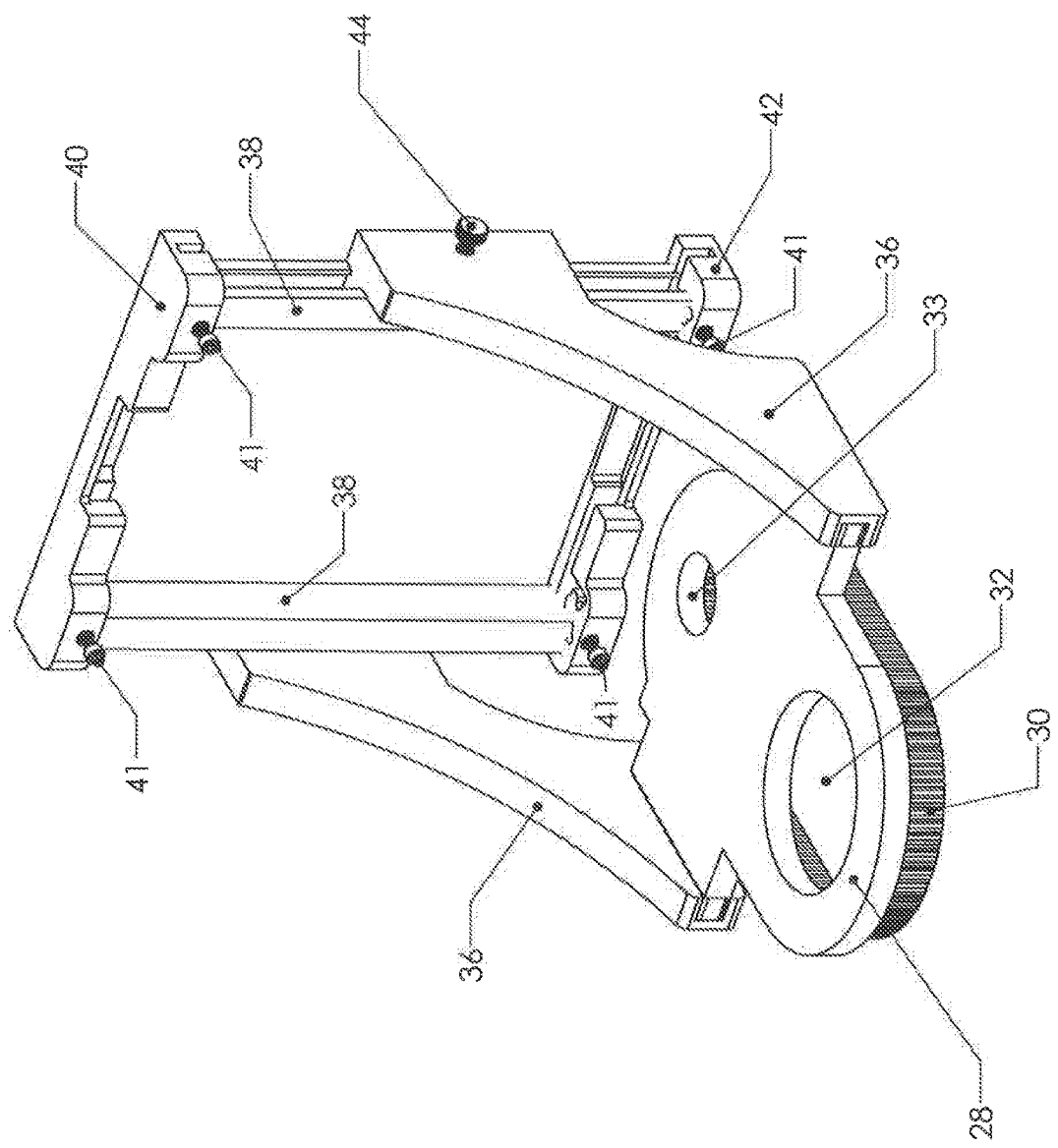
FIG. 6 is a perspective view of an alternative embodiment of the debris control apparatus.

FIG. 6 shows an alternative mounting assembly for shield 28, in which rails 38, instead of facing forward in the Y direction as shown in FIG. 1, face left and right respectively in the X direction (i.e., a side mount configuration). Arms 36 are modified accordingly in shape to fit into rails 38.

Figure 9:
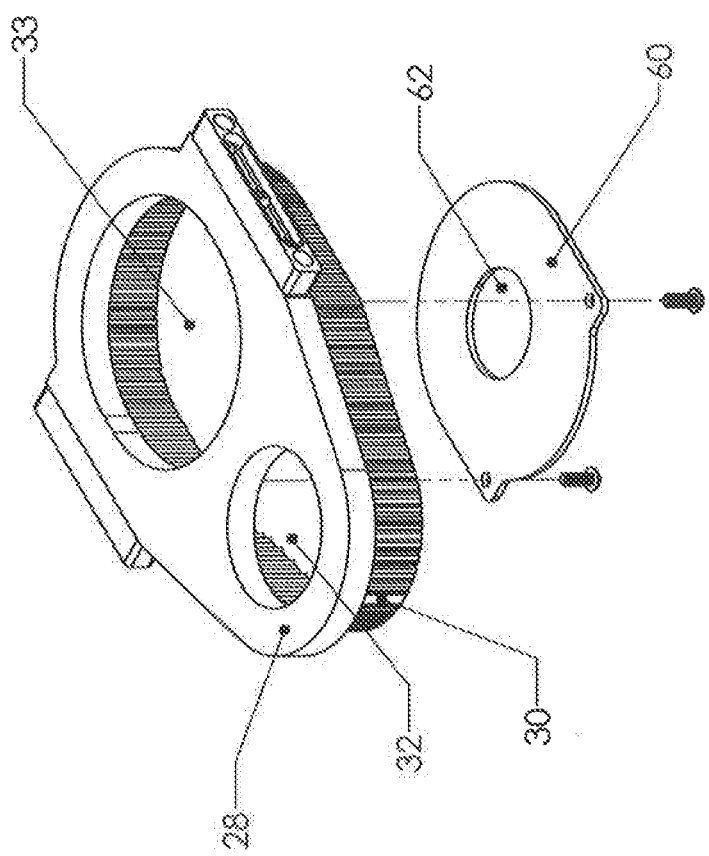
FIG. 9 is an exploded view of some of the components of the debris control apparatus.

In the embodiment shown in FIG. 9, the apparatus includes an air flow reducer 60, which is sized and shaped to fit over opening 33, and which includes its own central opening 62. Air flow reducer 60 reduces the size of opening 33 to reduce the flow of air through opening 33, thus reducing the escape of debris through opening 33 and allowing for better control of debris. With the reduction of air flow, more debris will remain under the shield 28, and less will come out through opening 33.

The configuration of FIG. 9 provides a certain flexibility to the apparatus. In an embodiment where the cutting tool needs to go very deep into the work material, the opening 33 may need to be relatively large so that the end of the spindle can enter the opening 33 somewhat. However, when the deeper movement of the spindle is not required, the air flow reducer 60 may be used, to reduce the size of the opening in shield 28.

It will be appreciated that the combination of shield 28 having a large opening 33, and flow reducer 60, provides greater flexibility. The large opening 33 can be employed when the cutting tool is relatively large and requires more space. When a smaller cutting tool, requiring less space, is in use, the flow reducer 60 can be used, and opening 62 is large enough for the small cutting tool to extend through.

Figure 10:
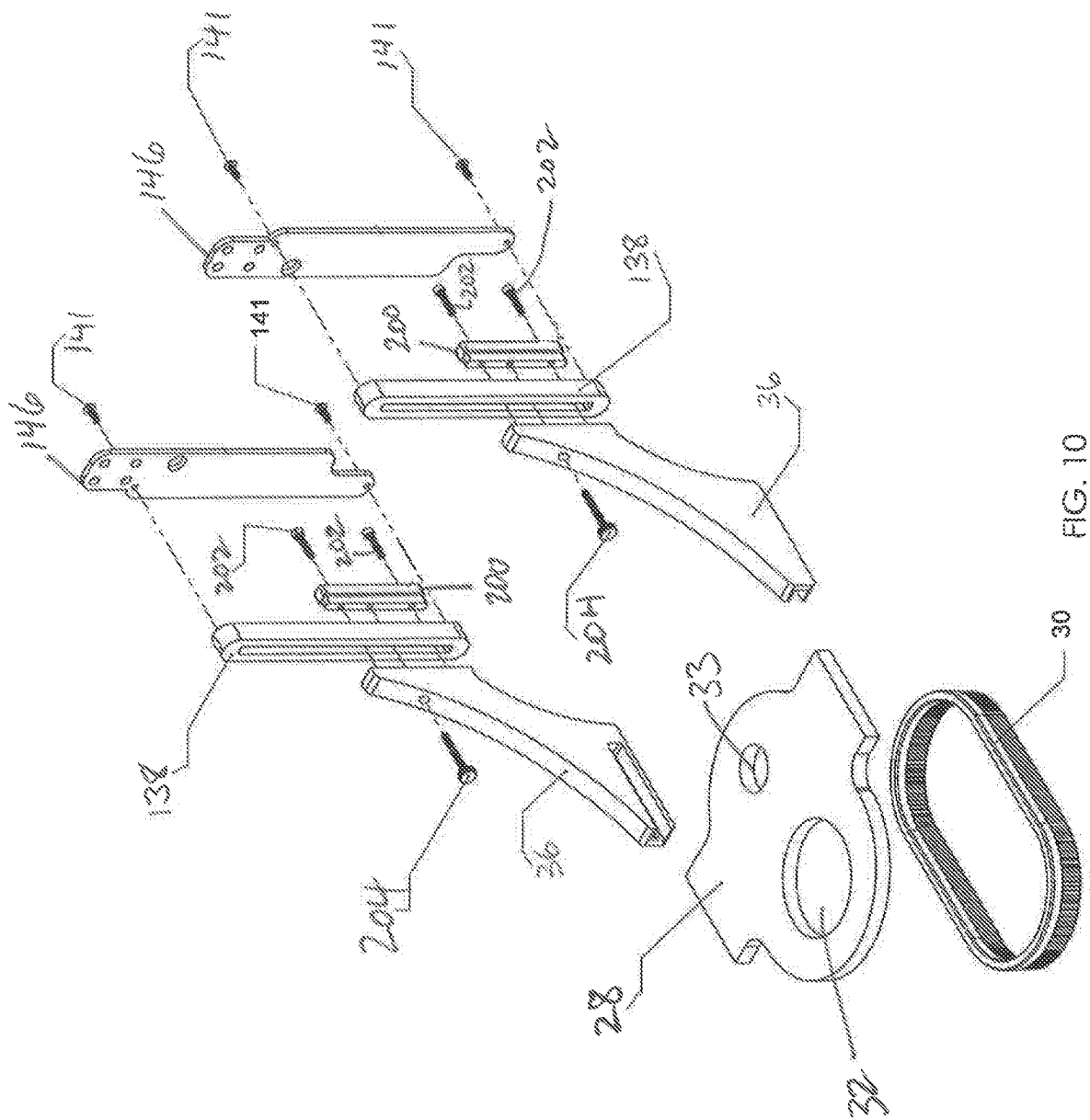
FIG. 10 is an exploded perspective view of a further alternative embodiment of the debris control apparatus.

Referring now to FIG. 10, an exploded view of an alternative form of the debris control apparatus is shown. The main difference between this alternative form, and the debris control apparatus shown in FIGS. 1, 3, 4 and 5, is the mode by which the arms 36 are mounted and positioned. In the embodiment of FIG. 10, rails 138 are attached to flanges 146 by means of rail screws 141. Support arms 36 are mounted to rails 138 by means of support arm guides 200 attached by guide screws 202 to support arms 36, via rails 138. Thus, the support arms 36, connected by guides 200, is slidable within rails 138. To position arm 36 at a particular depth, arm positioning screw 204 is inserted through arms 36 and tightened against guide 200 to hold the arm and the guide in place.

It will be appreciated that the mounting assemblies of, for example, FIG. 3, FIG. 6 and FIGS. 10 all differ primarily because of the specifics of machine 10 that they are being mounted to. It will be appreciated that different machines 10 include different configurations to which the debris control apparatus is to be mounted. Thus, different mounting assemblies may be required to mount the shield 28 and brush 30 in a height adjustable manner so that brush 30 remains flush against the work material 13 as the cutting tool moves into, out of and along work material 13.

There are other possible differences in the way the apparatus may be mounted. For example, FIG. 1 shows the X-axis carriage 22 carrying Z-axis rail 70, which in turn carries Z-axis carriage 72 (which moves up and down on rail 70), which in turn carries spindle 24. In some embodiments, it may be desirable, for example, to mount the mounting assembly to the Z-axis rail 70 (rather than, for example, X-axis carriage 22), which is still comprehended by the preferred embodiment because the Z-axis rail does not move up and down with the cutting tool, but is effectively stationary relative to the cutting tool.

It has been found that a brush height of about 0.75 inches to 1.5 inches is preferred. This amount of space under shield 28 appears maximize the effectiveness of the vacuum which still allowing the enclosure to clear work material hold downs and clamps that the enclosure passes over.

Figure 11:
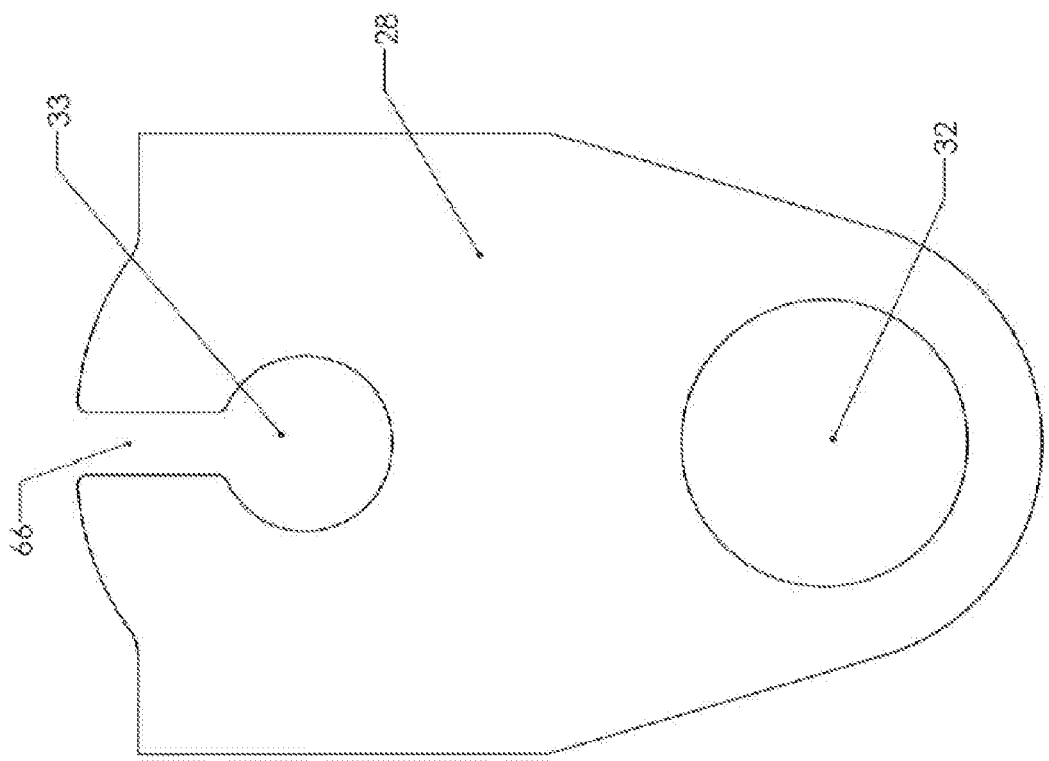
FIG. 11 is a plan view of an embodiment of a shield according to the present invention.

Referring now to FIG. 11, an alternative form of shield 28 is shown. In the embodiment of FIG. 11, opening 33 includes tool removal conduit 66 which extends from opening 33 to the edge of shield 28. In this configuration, opening 33 is contiguous with an edge of shield 28 and allows shield 28 and a tool extending there through to be taken apart without the tool being lifted out through opening 33. Thus, if for some reason the machine 10 is malfunctioning, or for some other reason the tool is stuck in a down position, the shield 28 can be extracted by moving the shield 28 so that the tool moves through conduit 66. Typically, in configurations where the brush 30 is detachably attached to shield 28, the brush would be removed before the tool is moved out through conduit 66.

Figure 11C:
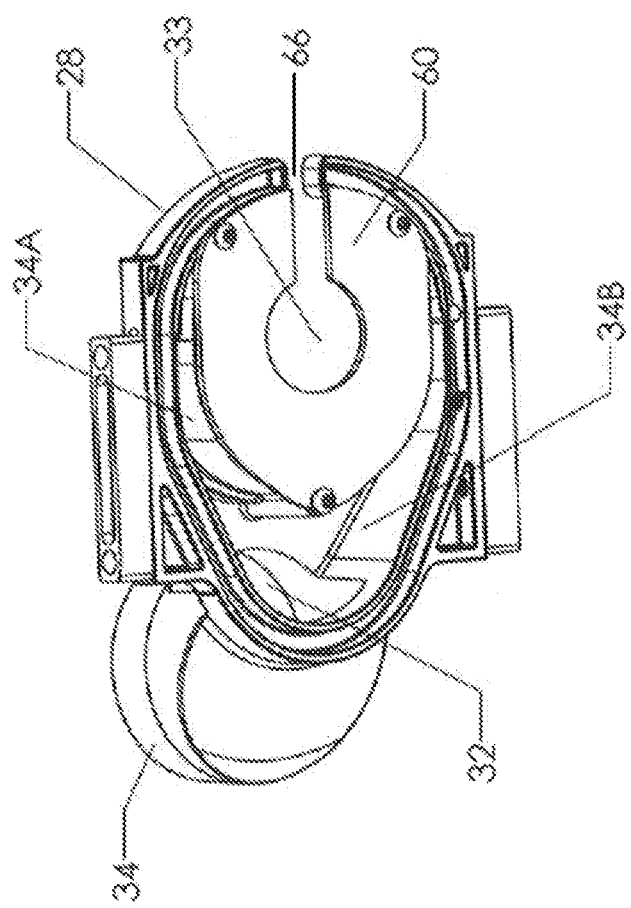
FIG. 11C is another perspective view of the debris shield of FIG. 11A from a different angle.

Referring now to FIGS. 11A-C, an alternative form of shield 28 is shown. In the embodiment of the debris shield 28 shown in FIGS. 11A and C, the opening 33 includes a tool removal conduit 66 extending from the opening 33 to the edge of the shield 28. The tool removal conduit 66 can be fitted with a gate 67 shown in FIGS. 11A and 11B to close tool removal conduit 66. It will be appreciated that closing the tool removal conduit 66 may reduce the amount of debris that escapes through the tool removal conduit 66, allowing for better control of debris.

The gate 67 and the shield 28 are configured such that the tool removal conduit 66 can be selectively opened and closed by adjusting the gate 67, respectively, to an open position and a closed position. For example, the gate 67 could be rotatably secured to the shield 28 using a hinge (not shown), or formed of an elastic material (not shown) that biases to a closed position when not under stress, and that can be selectively deformed to an open position, opening tool removal conduit 66.

Preferably, the gate 67 can be selectively secured in its closed position to prevent the tool removal conduit 66 from being unintentionally opened.

When the tool removal conduit 66 is opened, the shield 28 can be extracted from a tool extending through the opening 33 by moving the shield 28 such that the tool moves out through the tool removal conduit 66. It will be appreciated that the gate 67 need not be a single gate that closes tool removal conduit 66. For example, the gate 67 could comprise two or more gates (not shown), arranged like the swinging doors of a saloon, which may all need to be opened in order to permit the tool extending through opening 33 to move out through the tool removal conduit 66.

Preferably, the gate 67 is selectively removable from the shield 28, where the tool removal conduit 66 is opened when the gate 67 is removed from the shield 28. For example, the gate 67 may be secured to shield 28 using two shield magnets 68 disposed on a face of shield 28 that correspond with two gate magnets 69 on the gate 67. It will be appreciated that a different set of elements could be used to achieve selectively removable mounting of the gate 67 to the shield 28, such as screws, clips, a friction fitting, etc. It will further be appreciated that the gate 67 need not be selectively removable; the gate 67 may be merely selectively openable and closable but otherwise secured to the shield 28.

The gate 67 comprises a brush 30A. The brush 30A may be sized such that, when the gate 67 is closed, the brush 30A is substantially continuous with a brush 30 of the shield 28, closing the gap in the brush 30 created by the opening 33 and reducing the amount of debris that escapes from under shield 28. In other embodiments, the gate 67 may comprise other structures for closing the gap in the brush 30 created by the opening 33. For example, the gate 67 may simply form a solid wall in the tool removal conduit 66 (not shown) when assembled with the shield 28, and the solid wall may be slightly shorter in height than the brush 30 of shield 28 so to reduce interference with the work material 13.

Figure 17:
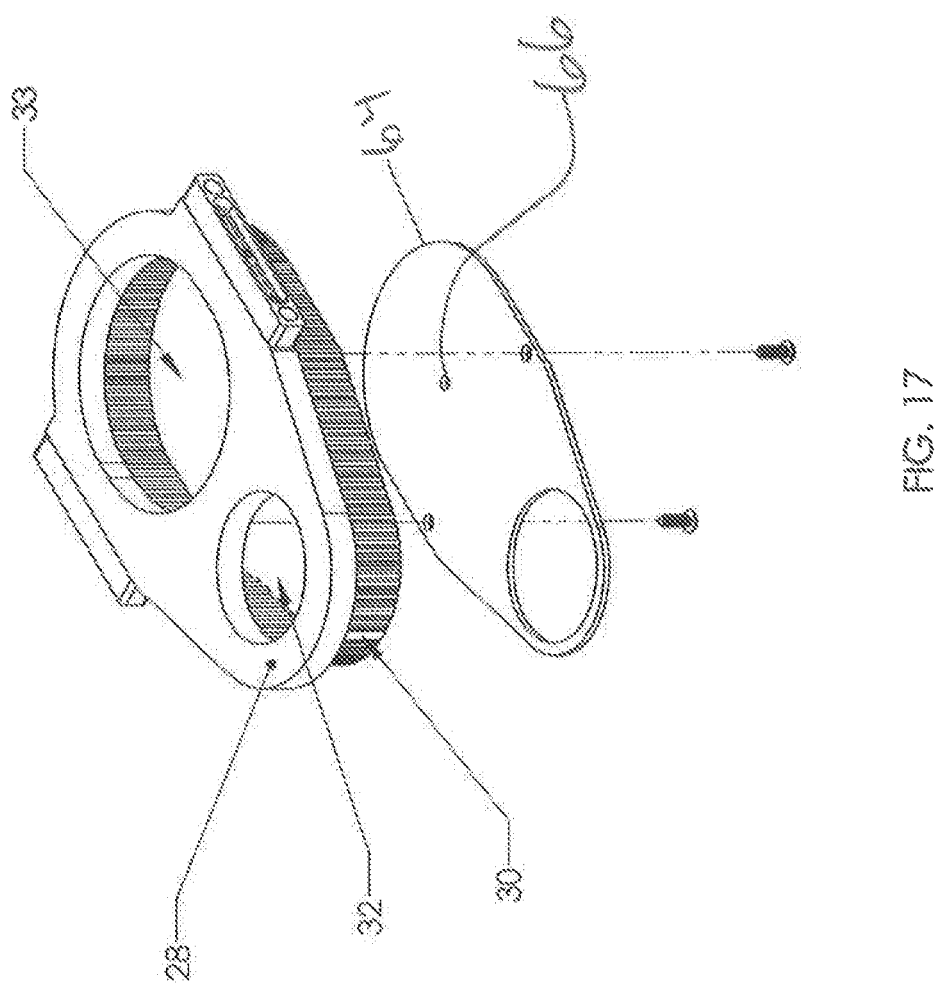
FIG. 17 shows a laser shield according to an embodiment of the present invention.

It will be appreciated that the present invention may be employed with a machine 10 that uses a laser cutting tool. Laser cutting tools can produce not only solid debris, but harmful gases, which can be contained and vacuumed away using the debris control apparatus. Furthermore, the shield 28 can be fashioned from a light attenuating material that can be used to shield the eyes of persons viewing the laser cutting. Referring now to FIG. 17, laser shield 64 may be attached to shield 28. Laser shield 28 blocks most of the area of opening 33, and leave only laser cutter opening 66 to permit the laser cutting beam to travel to work material 13. The shield 64 provides a much smaller area through which the gases can escape, permitting them to be vacuumed up before they can escape into the ambient air and harm people nearby. Preferably, shield 64 can (like shield 28) be made from a translucent material that simultaneously shields the eyes from the harmful electromagnetic rays from laser cutting, obviating the need for the wearing of goggles by the user.

It will be appreciated that preferably, the debris control apparatus is configured to attach to the machine 10 without substantial alteration or modification of machine 10. Thus, most preferably, the mounting assembly is configured so that it attaches to the machine 10 as is, without modification. Thus, if machine 10 already has holes on various plates, flanges etc. through which mounting screws can be attached, then ideally, the apparatus can make use of such existing holes for the mounting assembly. Less preferably, some minor modifications are comprehended by the preferred embodiment, such as, for example, drilling screw holes in machine 10 which can be used to receive mounting screws and the like.

Thus, for example, in the embodiment shown in FIGS. 1-4, carriage mounts 40, 42 include recesses that receive both flange 46 and rails 38. Thus, rails 38 can be held against flange 46 without drilling any holes in flange 46. In this embodiment, tightening screws 41 holds the carriage mounts and rails 38 all on flange 46. The mounting assembly is thus connected to machine 10 without modifications thereto.

Referring now to FIGS. 12-14, an alternative mounting assembly is shown. In this embodiment, flange 246 includes holes through which screws 241 can extend to fasten rails 238 to the machine 10. Nuts 239 cooperate with screws 241 to hold the rails 238 on the machine. Screws 241 extend through flange 246 and through a hole in the side of each rail element 238. Meanwhile, the depth adjustment is achieved using screws 304 connected screwing into guides 300 to adjust the mounting depth of arms 36. Screws 304 attach guides 300 to rails 238 at the desired depth. This aspect of the mounting (i.e., the use of guides) is generally similar to the embodiment of FIG. 10. In this embodiment, arms 36 each include widening portions 302 and widening connectors 303 which allow arms 36, narrowly spaced at the shield 28, to be widened for mounting to machine 10 when the mounting position is wider than in other configurations.

Figure 16:
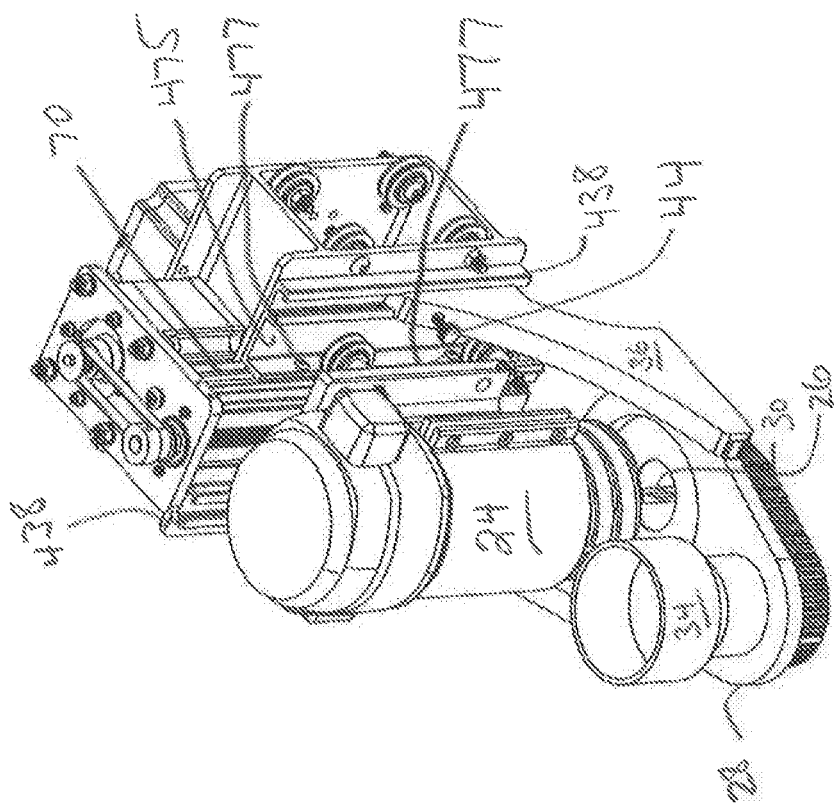
FIG. 16 shows a portion of a cutting machine with the embodiment of FIG. 15 mounted thereto.
Figure 15:
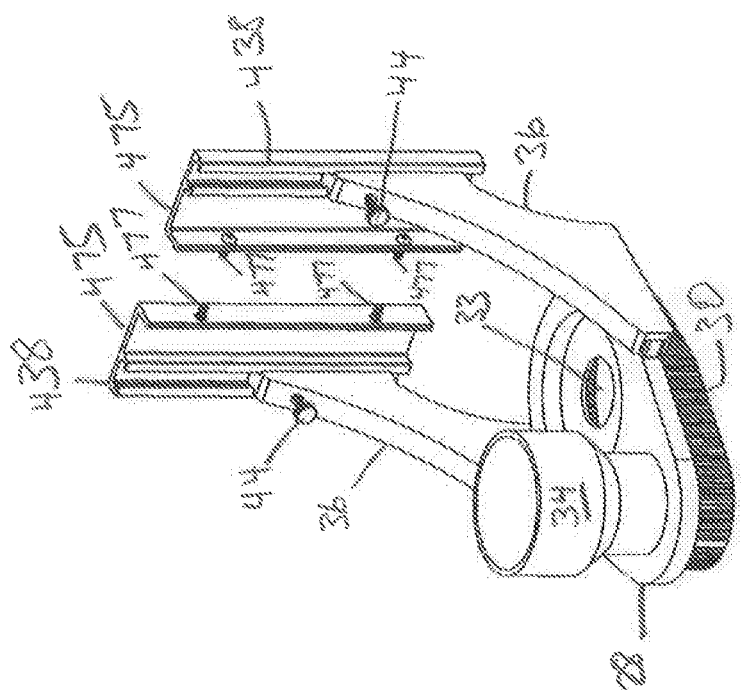
FIG. 15 is a perspective view of an alternative embodiment of the debris control apparatus.

Referring now to FIGS. 15 and 16, an alternative mounting assembly is shown. Rails 438 are attached to brackets 475. Screws 477 are used to attach the brackets 475 to Z-axis rails 70, or to a portion of the X-axis carriage adjacent to the Z-axis rails. T-slot nuts (also known as double spring tab fasteners, not shown) are preferably inserted into the z-axis rails, and screws 477 are screwed into the nuts to hold the brackets 475 in place. This is also a side mount configuration, with the mounting assembly attaching to a portion of machine 10 that faces left or right, rather than forward. It will be appreciated that other side mount, front mount and even rear mount configurations are comprehended.

Figure 18:
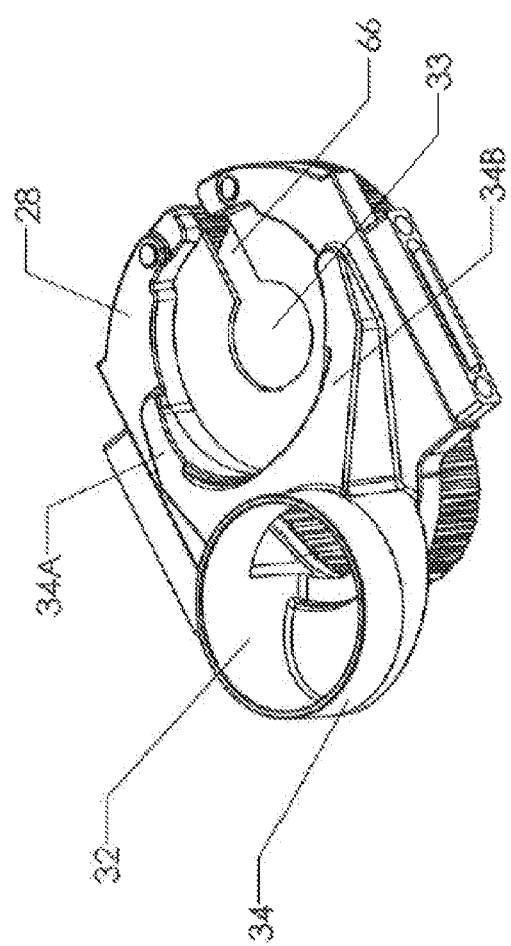
FIG. 18 is a perspective view of a debris shield of a debris control apparatus, in accordance with an alternative embodiment.
Figure 19:
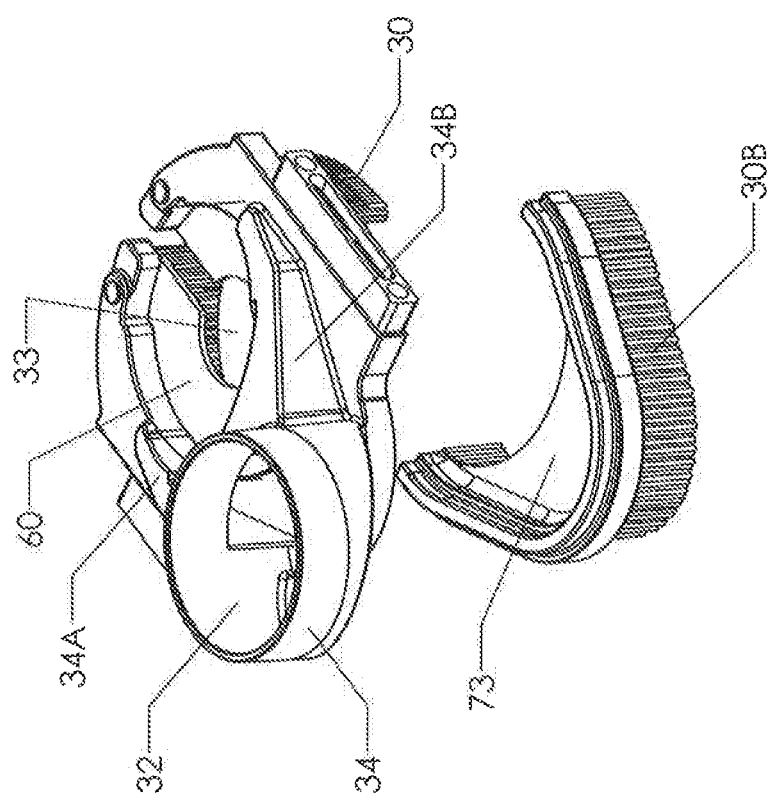
FIG. 19 is a partially exploded view of the debris shield of a debris control apparatus, in accordance with an alternative embodiment.
Figure 20:
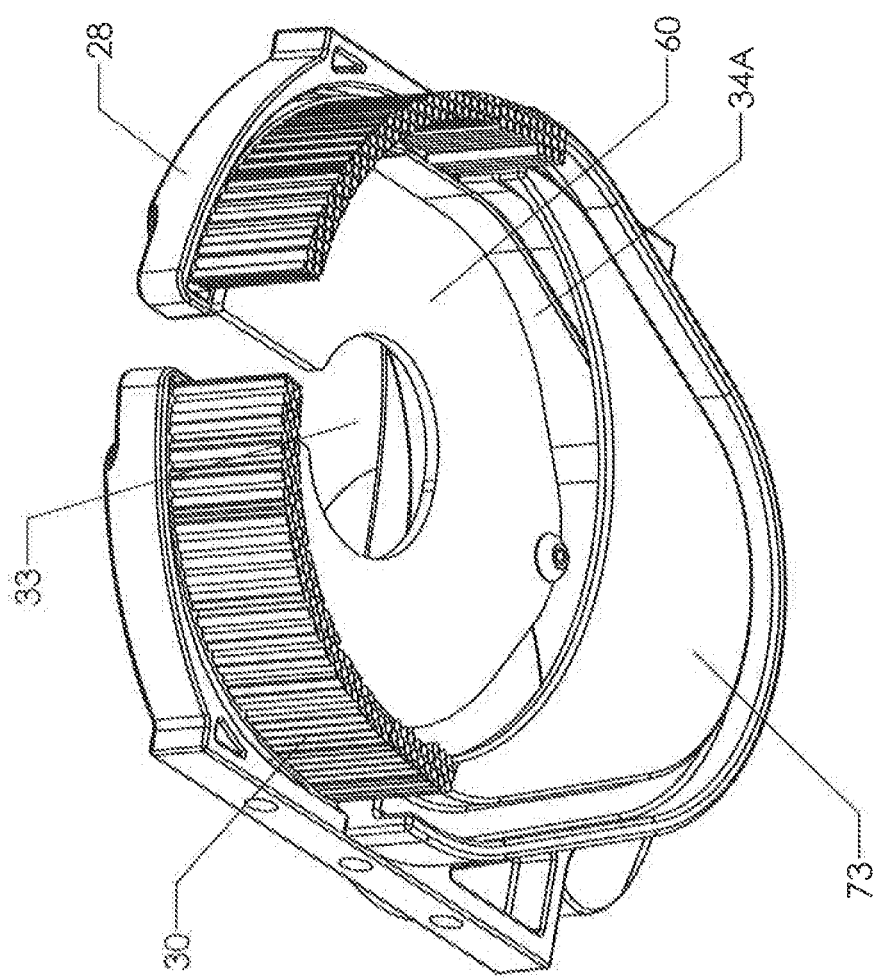
FIG. 20 is a perspective view of the debris shield of FIG. 19 where the flow redirection element is assembled.

Referring to FIGS. 18-20, an alternative embodiment of a shield 28 is shown. A vacuum conduit 34 of the shield 28 is integrally molded on the top surface of to the shield 28, extending a vacuum fitting opening 32 of the shield 28. Having the vacuum conduit 34 and the shield 28 be formed together as one piece may improve the durability of the apparatus and/or reduce manufacturing costs.

The shield 28 also comprises the channels 34A, 34B under the shield 28. The channels 34A, 34B are in fluid communication with the vacuum conduit 34 and each comprise a portion around the periphery of the opening 33. The channels 34A, 34B are open around the periphery of the opening 33 of the shield 28 to conduct debris. In some embodiments, the channels 34A, 34B may have one or more discrete openings around the periphery of the opening 33. In some embodiments, such as ones without the tool removal conduit 66, the channels 34A, 34B may be fluidly connected around the periphery of the opening 33.

When suction pressure is provided through the vacuum conduit 34, the channels 34A, 34B direct the suction pressure around the periphery of the opening 33. In this way, the high concentration of suction pressure at the vacuum fitting opening 32 of the shield 28 in other embodiments (e.g., ones without the channels 34A, 34B) can be directed and distributed around the periphery of the opening 33. Directing suction pressure around the periphery of the opening 33 can increase the rate of debris removal through the vacuum conduit 34, in part by directing suction pressure to regions closer to the debris (e.g., the periphery of the opening 33). In contrast, in embodiments resulting in a high concentration of suction pressure at the vacuum fitting opening, suction pressure in certain regions under the shield 28 (e.g., those furthest from the vacuum fitting opening 32) may have low suction pressure, resulting in a lower rate of debris removal from that region.

In some embodiments, the distribution of suction pressure around the periphery may be more or less even around the periphery of the opening 33. It will be appreciated that distributing suction pressure evenly around the periphery of the opening 33 can reduce the likelihood of debris building up under the shield 28 at, e.g., points of lesser suction pressure. Reducing local debris buildup under the shield 28 can reduce the amount of debris that escapes under the brush 30 when, e.g., the shield 28 is moved relative to the work material.

It will be appreciated that the shield 28 and the vacuum conduit 34, even in non-preferred embodiments, may be sized, shaped, and configured so as to enhance debris removal through the vacuum conduit 34 by an operating vacuum hose (not shown) assembled with the vacuum conduit 34.

In other embodiments, for example, the shield 28 and vacuum conduit 34 could be shaped and contoured so as to reduce recirculation of debris under the shield 28, or so as to minimize the area or volume of the enclosure under the shield 28. The shield 28 and the vacuum conduit 34 could also be shaped and contoured so as to reduce the amount of debris escaping through the tool access opening 33.

Referring to FIGS. 19 and 20, an alternative embodiment of a shield 28 is shown. The shield 28 comprises a selectively detachable flow redirection element 73. In some embodiments, the flow redirection element 73 may not be detachable and may further be integrally molded to the shield 28.

The flow redirection element 73 comprises a flow barrier, such as a flat plate. The flow redirection element 73 may increase the rate of debris removal from under the shield 28 by increasing the suction pressure directed around the tool opening 33. The flow redirection element 73 may increase the suction pressure directed around the tool opening 33 by redirecting suction pressure to the channels 34A, 34B; however, it will be appreciated that in embodiments without the channels 34A, 34B, using a flow redirection element 73 may still increase the rate of debris removal from under the shield 28.

In other embodiments, the flow redirection element 73 may comprise plate that is angled, curved, contoured, textured, and/or comprising one or more holes. It will be appreciated that the properties of the flow redirection element 73 can be adjusted depending on the desired airflow under the shield 28. For example, the flow redirection element 73 could be curved and textured to reduce turbulence, or could have one or more holes in order to slightly increase the suction pressure provided to the area under the flow redirection element 73 (as compared to the suction pressure to that area when the flow redirection element 73 has no holes).

The flow redirection element 73 may comprise a brush 30B. The brush 30B is substantially continuous with the brush 30 of the shield 28 and reduces the amount of debris that escapes from under shield 28. In other embodiments, the flow redirection element 73 may not have a brush 30B, or the brush 30B may be selectively removable from the flow redirection element 73.

The debris shield in FIG. 20 is shown without the brush 30B. It will be appreciated that using the debris shield 28 without the brush 30B will allow the user to see under the debris shield 28. While the amount of debris that escapes from under the shield 28 may increase where the brush 30B is not used, this increase can be mitigated by, for example, increasing the suction pressure applied to the vacuum conduit 34 of the debris shield 28 or adjusting the plate of the flow redirection element 73 to be closer to the work material.

It will be appreciated that where the brush 30B is selectively removable from the flow redirection element 73, it is preferable to use the debris shield 28 with the flow redirection element 73 assembled, and to remove the flow redirection element 73 only when it is desired, e.g., to view the enclosure under the debris shield 28.

It will be appreciated that, even in non-preferred configurations in which the shield or enclosure is mounted to machine 10 so as to move up and down as the cutting tool moves in and out of the cutting material, the detachable attachment configuration of the shield/enclosure may be employed. As disclosed, for example, in FIGS. 1-4, the enclosure is detachably attached to the mounting assembly. It preferably is attached by at least one magnetic connector which holds the enclosure in place, but whose holding force can be overcome but manual detachment of the enclosure from the mounting assembly. Locking pins or the like, or a friction fit, may for example be employed as alternatives to the at least one magnetic connector. Preferably, at least one enclosure support element (e.g., one or more arms 36) is attached to the machine 10 and carried the enclosure. Preferably, the enclosure and support element are configured so that the enclosure is attached to the support element and detached therefrom in a front-back direction. Alternatively, the shield 28 can come off in a sideways or other direction. The detachable attachment of the shield 28 is, as mentioned above, beneficial because it allows for easy change of the cutting tool and/or work material without having to take apart the mounting assembly, or to even raise the mounting assembly, or to change the depth of the mounting assembly. Rather, the brush and shield can be removed, the cutting tool or work material changed, and the shield and brush reattached without any action on the mounting assembly.

While the foregoing preferred embodiments of the present invention have been set forth in considerable detail for the purpose of making a complete disclosure of the invention, it will be apparent to those skilled in the art that other embodiments described herein are comprehended by the broad scope of the invention as defined in the appended claims. For example, the brush 30 as shown in the attached drawings has bristles. However, the invention comprehends other forms of brushes (e.g., sponge material). The function of the brush 30 in the preferred embodiment is to hold the debris under shield 28 as the shield 28 moves along the work material, until that debris is vacuumed up.

The above references to U.S. patents in all sections of this application are herein incorporated by references in their entireties for all purposes. Components illustrated in such patents may be utilized with embodiments herein. Incorporation by reference is discussed, for example, in MPEP section 2163.07(B).

All of the features disclosed in this specification (including the references incorporated by reference, including any accompanying claims, abstract and drawings), and/or all of the steps of any method or process so disclosed, may be combined in any combination, except combinations where at least some of such features and/or steps are mutually exclusive.

Each feature disclosed in this specification (including references incorporated by reference, any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any incorporated by reference references, any accompanying claims, abstract and drawings), or to any novel one, or any novel combination, of the steps of any method or process so disclosed.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents, as well as the following illustrative aspects. The above described aspects embodiments of the invention are merely descriptive of its principles and are not to be considered limiting. Further modifications of the invention herein disclosed will occur to those skilled in the respective arts and all such modifications are deemed to be within the scope of the invention.

The invention claimed is:

1. A debris control apparatus for a cutting machine, wherein the cutting machine includes a cutting tool for cutting a work material, the apparatus comprising:
   a debris control enclosure including a cutting tool access opening extending through the debris enclosure along an opening center axis and shaped to admit the cutting tool to the work material while the debris enclosure contains, within the enclosure and on the work material, debris from the cutting of the work material, as the cutting tool moves along the work material, the enclosure further comprising a vacuum through-opening in said enclosure, the vacuum opening in fluid communication with a vacuum conduit, connected to a vacuum source, for extracting the debris from the enclosure, the enclosure including a first flange and a second flange, the first flange being on one side of the cutting tool access opening and the second flange being on an opposite side of the cutting tool access opening; and
   a mounting assembly for mounting the enclosure to the machine such that during operation of the machine, the enclosure moves along the work material as the cutting tool moves along the work material, the mounting assembly including a pair of slots, the enclosure and mounting assembly being configured such that the enclosure is selectively detachably attached to and detached from the mounting assembly by sliding each of the first and second flanges into and out of a corresponding one of the slots along a direction transverse to the opening center axis.

2. The apparatus as claimed in claim 1, wherein the mounting assembly comprises a depth adjuster for enabling an operating depth of the enclosure to be adjusted, and
   wherein the cutting tool or work material may be changed after detaching the enclosure from the mounting assembly, without action on the mounting assembly other than said detaching.

3. The apparatus as claimed in claim 1, wherein the mounting assembly includes at least one support arm having one of the slots for receiving the enclosure, and wherein the enclosure may be inserted into and withdrawn from the one slot of the at least one support arm.

4. The apparatus as claimed in claim 1, wherein the mounting assembly and enclosure are attached by at least one magnetic connector.

5. The apparatus as claimed in claim 4, wherein the enclosure is detached from and attached to the mounting assembly by sliding the enclosure in the direction transverse to the opening center axis, which direction is a front-back direction.

6. The apparatus as claimed in claim 1, wherein the vacuum conduit is integral to the enclosure.

7. A debris control apparatus for a cutting machine, wherein the cutting machine includes a cutting tool for cutting a work material, the apparatus comprising:
   a debris control enclosure including a cutting tool access opening extending through the debris enclosure along an opening center axis and shaped to admit the cutting tool to the work material while the debris enclosure contains, within the enclosure and on the work material, debris from the cutting of the work material, as the cutting tool moves along the work material, the debris control enclosure comprising a vacuum through-opening in said enclosure, the vacuum opening assembled and in fluid communication with a vacuum conduit, connected to a vacuum source, for extracting the debris from the enclosure, the enclosure including a first flange and a second flange, the first flange being on one side of the cutting tool access opening and the second flange being on an opposite side of the cutting tool access opening, the enclosure further including a flow redirection element; and
   a mounting assembly for mounting the enclosure to the machine such that during operation of the machine, the enclosure moves along the work material as the cutting tool moves along the work material, the mounting assembly including a pair of slots, the enclosure and mounting assembly being configured such that the enclosure is selectively detachably attached to and detached from the mounting assembly by sliding each of the first and second flanges into and out of a corresponding one of the slots along a direction transverse to the opening center axis.

* * * * *